United States Patent [19]

Rezmer

[11] Patent Number: 4,998,091
[45] Date of Patent: * Mar. 5, 1991

[54] ANIMAL WARNING ALARM

[75] Inventor: Leonard D. Rezmer, Montrose, Mich.

[73] Assignee: The Game Tracker, Inc., Flushing, Mich.

[*] Notice: The portion of the term of this patent subsequent to Feb. 27, 2007 has been disclaimed.

[21] Appl. No.: 350,244

[22] Filed: May 11, 1989

Related U.S. Application Data

[63] Continuation-in-part of Ser. No. 226,793, Aug. 1, 1988, Pat. No. 4,903,630.

[51] Int. Cl.$^5$ ............................................. G08B 3/00
[52] U.S. Cl. .............................. 340/384 E; 340/425.5
[58] Field of Search ............ 340/384 R, 384 E, 425.5, 340/388, 391, 404, 406; 116/22 A, 28 R, 137 A, 142 R; 248/314

[56] References Cited

U.S. PATENT DOCUMENTS

| | | | |
|---|---|---|---|
| 3,516,384 | 6/1970 | Will | 116/137 A |
| 3,872,472 | 3/1975 | Moschgat | 340/384 E |
| 3,890,612 | 6/1975 | Sweany et al. | 340/384 E |
| 4,091,383 | 5/1978 | Rainville | 340/425.5 X |
| 4,104,610 | 8/1978 | Inoue et al. | 116/137 AX |
| 4,374,377 | 2/1983 | Saito et al. | 340/384 E |
| 4,437,428 | 3/1984 | Hoffelner | 116/22 AX |
| 4,633,215 | 12/1986 | Anders et al. | 116/173 X |
| 4,903,630 | 2/1990 | Rezmer | 116/22 A |

Primary Examiner—Joseph A. Orsino
Assistant Examiner—Brian R. Tumm
Attorney, Agent, or Firm—William D. Blackman; Arnold S. Weintraub

[57] ABSTRACT

An ultrasonic sound producing apparatus for mounting on a vehicle to warn animals of the approach of the vehicle includes (a) a housing, (b) an electrically actuated member for generating an electric tone, and (c) a base for supporting the housing and for mounting the apparatus to a vehicle. In a preferred embodiment, the tone generating member includes a piezoelectric crystal.

6 Claims, 1 Drawing Sheet

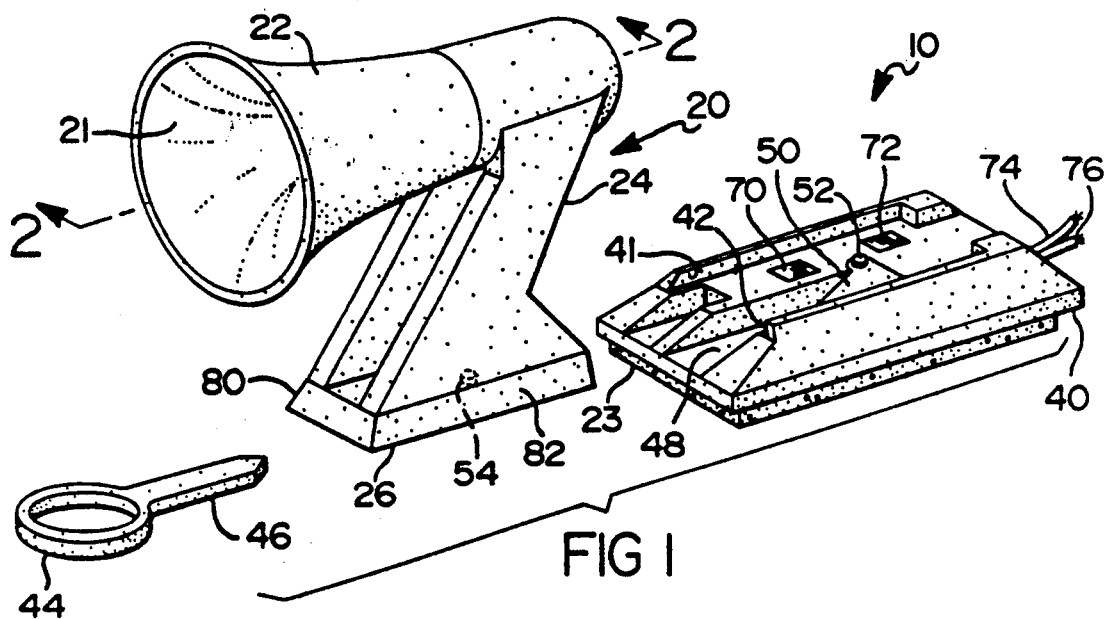
FIG 1
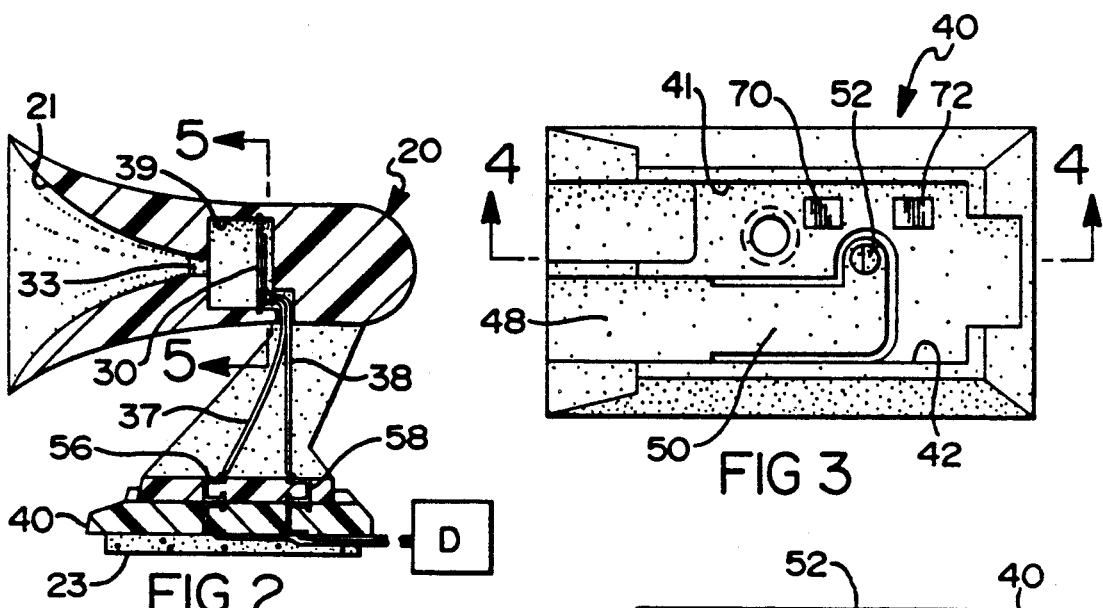
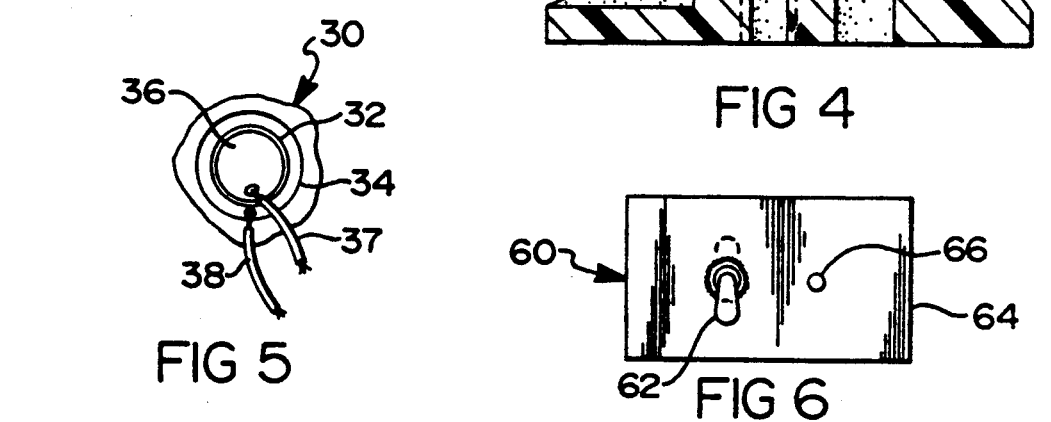

ANIMAL WARNING ALARM

REFERENCE TO PRIOR APPLICATION

This application is a continuation-in-part of U.S. patent application Ser. No. 226,793, filed Aug. 1, 1988, now issued as U.S. Pat. No. 4,903,930 the disclosure of which is hereby incorporated by reference.

BACKGROUND OF THE INVENTION

1. Field of the Invention

The present invention relates generally to a device to warn animals of an oncoming vehicle. More particularly, the present invention relates to an ultrasonic sound-producing apparatus for mounting on a vehicle to warn animals of the approach of the vehicle, the apparatus being electronically operated.

2. Description of the Prior Art

Many animals, both wild and domesticated, are killed in unfortunate accidents on our roadways each year. Warning devices to alert animals to the presence of an oncoming vehicle are of some help in preventing these deaths, but heretofore have not been as effective as would be preferable. The best of the known devices to warn animals of an oncoming vehicle consist of ultrasonic whistles which can be mounted on a vehicle either on the bumper or other convenient place. Unfortunately, these prior art devices require favorable wind conditions to operate.

These wind actuated devices put out signals of varying strength and frequency, depending on such factors as prevalent wind conditions and moving speed of the vehicle. Ideally, an ultrasonic animal warning device would generate sound at a constant frequency, regardless of wind speed and direction or of vehicle speed. In addition, an ideal ultrasonic sound producing apparatus would be removable from the vehicle in the event that the vehicle were to go through an automatic car wash, or for storage and protection purposes.

SUMMARY OF THE INVENTION

The present invention provides an ultrasonic sound generating apparatus which is attachable to a vehicle and which is electronically actuated.

An ultrasonic sound producing apparatus mountable on a vehicle to warn animals of the approach of the vehicle in accordance with the present invention comprises:

(a) a housing;

(b) electrically actuated means disposed within the housing for generating an ultrasonic tone; and (c) a base for supporting the housing and for mounting the apparatus to a vehicle.

In a preferred embodiment, the apparatus of the present invention uses a piezoelectric element to generate ultrasonic signals.

For a more complete understanding of the present invention, reference is made to the detailed description section, which should be read with reference to the drawings. Throughout the following description and in the drawings, identical reference numbers are used to refer to the same component shown in multiple figures of the drawings; in which:

BRIEF DESCRIPTION OF THE DRAWINGS

FIG. 1 is an exploded perspective view of a preferred embodiment of the present invention, FIG. 2 is a cross section taken along the line 2—2 of FIG. 1, FIG. 3 is a top plan view of the base of the embodiment of FIG. 1, showing the base spring, and showing the button for locking the two sections together, FIG. 4 is a cross-section of the base, taken along the line 4—4 of FIG. 3;

FIG. 5 is a plan view of a piezoelectric element for generating an ultrasonic signal in the present invention, and FIG. 6 is a front plan view of an actuator switch assembly for mounting within a vehicle.

DETAILED DESCRIPTION OF THE PREFERRED EMBODIMENT

Referring to the drawings, the present invention comprises an ultrasonic sound producing apparatus 10 for mounting on a vehicle (not shown) to warn animals of the approach of the vehicle, the apparatus including a housing 20 which has a funnel portion 22 out of which sound produced by the device is passed. Neither the presence or absence of the funnel 22 nor the exact shape of the housing 20 is critical to the present invention, so long as there is at least one opening 33 in the housing to allow sound to pass outwardly therefrom. Disposed within the housing is an electrically actuated means 30 for generating an ultrasonic tone, and the housing 20 is preferably supported by a base 40 which serves as a means for mounting the apparatus 10 to a vehicle.

The funnel portion 22 has a mouth or opening 21 formed therein for sound waves to pass through and outwardly from the apparatus, the sound waves originating at the tone generating means 30 as will be further described herein.

The base 40 is provided for supporting the housing 20 and for mounting the apparatus 10 to a vehicle (not shown). The base 40 is disengagable and detachable from the housing 20 to allow for temporary removal of the housing 20 from a vehicle, as will be described more fully herein.

Referring now to FIGS. 1, 2, and 3, the housing 20 in one embodiment may include a socket section 26 which is slidably engageable with the base 40, so that the socket section 26 with the support section 24 and funnel portion 22 attached thereto may be removed for storage, or for movement of the vehicle through a car wash. Opposed side walls 80, 82 of the socket section 26 are outwardly tapered towards the bottom thereof, and this enables the socket section 26 to engagingly and retentively fit in between upwardly tapering walls 41, 42 of the base. For use in engagement and disengagement of the socket section 26 with the base 40, a key 44 having a substantially parallelepiped operative end 46 is used to slide into a groove 48 in the base 40 to push down on a spring 50, which normally is biased in an upward direction, and has a button 52 on its terminal portion. The insertion of the key 44 between the socket section and the base 40 in the groove 48 acts to push the spring 50 downwardly to disengage the button 52 from a socket or recess 54 in the socket section 26, thus allowing for slidable movement of the socket section 26 outwardly with respect to the base 40. A preferred embodiment of the present invention has an adhesive pad 23 or other type of adhesive material attached to the bottom of the base 40 for mounting the apparatus 10 to a vehicle.

The housing 20 further comprises a support section 24 for vertically distancing the tone generating means 30 from the base 40, although the support section 24 is not required. In the embodiment shown, the support section 24 consists of two support arms.

The housing 20 has at least one vent or opening such as that shown at 33 for allowing sound waves to pass outwardly therethrough, after which the sound passes through the mouth 21 of the funnel 22, and outwardly from the apparatus. The housing 20 preferably has a resonating chamber 39 formed therein in communication with the vent 33.

The means 30 for generating an ultrasonic tone in the depicted embodiment is a piezoelectric sound generating member 30. Piezoelectric members such as that shown at 30 are known for producing sound, and as shown in FIG. 5, a pizeoelectric member 30 generally comprises a thin piezoelectric crystal 32 bonded to a metal or other conductive surface of a plate 34. A thin layer of conductive material 36 is applied to a surface of the crystal 32 opposite the plate 34, such as by spray coating, bonding, or the like. The crystal 32 exhibits the property of changing thickness when a voltage is applied across it, and may be formed of quartz or other crystalline substance exhibiting piezoelectric properties. A first wire 37 is soldered to the conductive layer 36 and a second wire 38 is soldered to the plate 34. A suitable conventional piezoelectric driver circuit D is in electrical communication through the wires 37, 38 with the crystal 32 and operates to rapidly reverse a potential applied across the crystal 32, causing the crystal 32 to rapidly expand and contract to vibrate the plate 34, producing an ultrasonic tone when the frequency of the vibration is sufficiently high.

The wires 37, 38 may be connected to slide connectors 56, 58 respectively in the socket section, the slide connectors 56, 58 each having a downwardly exposed metal surface which engages with an upwardly exposed metal surface of corresponding slide connectors 70, 72 which are biased slightly upwardly to ensure a good connection. Third and fourth wires 74, 76 are attached to the slide connectors 70, 72 and communicate with the driver circuit D which is powered by an automobile battery (not shown). The wires 37, 38 and 74, 76 together with the slide connectors 56, 58 and 70, 72 provide a means for transmitting electricity to and from the piezoelectric member 30, as shown in FIG. 2. Alternatively, the wires 37, 38 may extend outwardly from the housing 20 without passing through the base 40 and may be provided with quick disconnect fittings for use in removal of the housing 20 from a vehicle.

Power for the apparatus 10 may be provided from a 12 volt battery such as a vehicle battery (not shown). In one embodiment, as seen in FIG. 6, a switch assembly 60 may be provided for mounting within the vehicle to allow for temporarily shutting off current flow to the apparatus 10 when a user of the apparatus 10 so desires, e.g., during a period of city driving or if the user notes that sound from the apparatus 10 bothers the neighborhood dogs. The switch assembly 60 is provided with a mounting plate 64 to which are mounted a toggle switch 62 and an indicator light emitting diode (LED) 66 to alert a user that the apparatus 10 is operative.

Although the present invention has been described herein with respect to specific embodiments thereof, it will be understood that the foregoing description is intended to be illustrative, and not restrictive. Many modifications of the present invention will occur to those skilled in the art. All such modifications which fall within the scope of the appended claims are intended to be within the scope and spirit of the present invention.

Having, thus, described the invention, what is claimed is:

1. An ultrasonic sound producing apparatus mountable on a vehicle to warn animals of the approach of the vehicle, comprising:
   (a) a housing which comprises a funnel having an opening formed therein to allow sound waves to pass therethrough and outwardly from the apparatus;
   (b) electrically activated means disposed within the housing for generating an ultrasonic tone; and
   (c) a base for supporting the housing and for mounting the apparatus to a vehicle; wherein the housing further comprises:
      (1) a support section attached to the funnel; and
      (2) a socket section which is attached to the support section at a lowermost end thereof and which is slidably engageable with the base, the socket section having a recessed socket formed in the underside thereof.

2. The apparatus of claim 1, wherein the tone generating means comprises a piezoelectric crystal.

3. The apparatus of claim 1, further comprising a disconnectable means for transmitting electrical energy to the tone generating means.

4. The apparatus of claim 3, wherein the housing is disconnectable and detachable from the base.

5. The apparatus of claim 4, wherein the base comprises an upwardly biased spring having a button attached thereto, the button being temporarily and disengagably engageable with the socket of the socket section to temporarily fix the housing into engagement with the base.

6. The apparatus of claim 1, further comprising an actuator switch connectable to the tone generating means to interrupt current flow to the apparatus.

* * * * *